United States Patent
Inoue et al.

(10) Patent No.: US 9,721,728 B2
(45) Date of Patent: Aug. 1, 2017

(54) BIAXIALLY ORIENTED POLYPROPYLENE FILM FOR CAPACITOR, METALLIZED FILM, AND FILM CAPACITOR

(71) Applicant: Toray Industries, Inc., Tokyo (JP)

(72) Inventors: Tomoyuki Inoue, Ibaraki (JP); Tetsuya Asano, Ibaraki (JP)

(73) Assignee: Toray Industries, Inc. (JP)

( * ) Notice: Subject to any disclaimer, the term of this patent is extended or adjusted under 35 U.S.C. 154(b) by 0 days.

(21) Appl. No.: 14/775,795

(22) PCT Filed: Mar. 13, 2014

(86) PCT No.: PCT/JP2014/056761
§ 371 (c)(1),
(2) Date: Sep. 14, 2015

(87) PCT Pub. No.: WO2014/142264
PCT Pub. Date: Sep. 18, 2014

(65) Prior Publication Data
US 2016/0027581 A1    Jan. 28, 2016

(30) Foreign Application Priority Data

Mar. 15, 2013  (JP) ................................. 2013-052899

(51) Int. Cl.
| | | |
|---|---|---|
| *H01G 4/14* | (2006.01) | |
| *B32B 27/32* | (2006.01) | |
| *B29C 55/12* | (2006.01) | |
| *C08J 5/18* | (2006.01) | |
| *H01G 4/18* | (2006.01) | |
| *H01G 4/33* | (2006.01) | |
| *B29K 23/00* | (2006.01) | |

(52) U.S. Cl.
CPC ............... *H01G 4/14* (2013.01); *B29C 55/12* (2013.01); *B32B 27/32* (2013.01); *C08J 5/18* (2013.01); *H01G 4/18* (2013.01); *H01G 4/33* (2013.01); *B29K 2023/10* (2013.01); *B32B 2457/16* (2013.01); *C08J 2323/12* (2013.01)

(58) Field of Classification Search
CPC  H01G 4/08; H01G 4/18; H01G 4/145; H01G 4/14; H01G 2/00; H01G 4/32
See application file for complete search history.

(56) References Cited

U.S. PATENT DOCUMENTS

| | | | | |
|---|---|---|---|---|
| 9,093,219 B2 * | 7/2015 | Sugata | .................... | B29C 55/12 |
| 9,123,471 B2 * | 9/2015 | Monno | ..................... | C08J 5/18 |
| 2002/0005924 A1 | 1/2002 | Kimura | | |
| 2009/0136714 A1 | 5/2009 | Itou | | |
| 2014/0016244 A1 | 1/2014 | Monno et al. | | |

FOREIGN PATENT DOCUMENTS

| | | |
|---|---|---|
| CN | 101374891 | 2/2009 |
| JP | 51-63500 A | 6/1976 |
| JP | 04-163042 A | 6/1992 |
| JP | 2001-072778 A | 3/2001 |
| JP | 2001-129944 A | 5/2001 |
| JP | 2001-324607 A | 11/2001 |
| JP | 3508515 B2 | 1/2004 |
| JP | 2007-308604 A | 11/2007 |
| JP | 2011-122143 A | 6/2011 |
| WO | 2012/002123 A1 | 1/2012 |
| WO | 2012/121256 A1 | 9/2012 |

OTHER PUBLICATIONS

Supplementary European Search Report dated Sep. 15, 2016, of corresponding European Application No. 14764685.5.

The First Office Action dated Apr. 6, 2017, of corresponding Chinese Application No. 201480013952.5, along with an English translation.

* cited by examiner

*Primary Examiner* — Nguyen Ha
(74) *Attorney, Agent, or Firm* — DLA Piper LLP (US)

(57) ABSTRACT

A biaxially orientated polypropylene film for capacitor includes protrusions on both surfaces. The biaxially orientated polypropylene film has a thickness (t1) of 1 to 3 μm, has a ten point average roughness (SRz) of 50 nm or more and less than 500 nm on both surfaces, and meets equations (1) and (2) where one surface and the other surface are referred to as a surface A and a surface B, respectively:

$$150 \leq Pa \leq 400 \qquad (1)$$

$$50 \leq Pb \leq 150 \qquad (2)$$

wherein Pa denotes number of protrusions per 0.1 $mm^2$ on the surface A and Pb denotes number of protrusions per 0.1 $mm^2$ on the surface B.

7 Claims, No Drawings

BIAXIALLY ORIENTED POLYPROPYLENE FILM FOR CAPACITOR, METALLIZED FILM, AND FILM CAPACITOR

TECHNICAL FIELD

This disclosure relates to biaxially orientated polypropylene film suitable for packaging and industrial uses and more specifically relates to efficiently producible biaxially orientated polypropylene film for capacitors that can maintain a very high withstand voltage as a capacitor dielectric material, as well as metalized film and film capacitors.

BACKGROUND

Having high transparency, good mechanical characteristics, and good electric characteristics, biaxially orientated polypropylene film have been applied in various fields including packaging materials, tape materials, and electric materials such as cable wrapping and capacitors.

In the field of capacitor production, in particular, such film has been preferred for high voltage capacitors, for both direct current and alternating current because of its good withstand voltage characteristics and low loss characteristics.

In recent years, increasing numbers of electric devices have been replaced with inverter-based ones and, accordingly, there are stronger demands for smaller-sized, large-capacity capacitors. To meet demands in such markets, particularly for automobiles (including hybrid cars), photovoltaic power generators and wind power generators, there is an urgent demand for biaxially orientated polypropylene film products that have improved voltage withstanding characteristics and further reduced thicknesses while maintaining high productivity and processability.

Biaxially orientated polypropylene film used in high voltage capacitors should have moderately roughed surfaces to maintain voltage withstanding characteristics, productivity, and processability. Such roughness is important to improve slip properties and oil impregnation properties and impart security protection properties particularly in vapor deposited capacitors. Security protection properties of a metal-deposited capacitor composed of dielectric film and metal-deposited film formed thereon to work as electrode are intended to prevent short-circuiting in the event of abnormal electric discharge by applying electric discharge energy so that the deposited metal is broken to recover insulating properties, which is a very useful function to ensure safety.

Methods proposed so far to roughen the surface of biaxially orientated polypropylene film include mechanical methods such as embossing and sand blasting, chemical methods such as chemical etching with a solvent, stretching of a sheet containing a dissimilar polymer such as polyethylene, and stretching of a sheet containing β crystals (for example, see Japanese Patent Application Laid-open Nos. 51-63500 and 2001-324607).

However, mechanical and chemical methods cannot achieve a sufficiently high roughness density and stretching a β crystal-containing sheet under common conditions tends to form bulky protrusions, possibly failing to produce a surface that is acceptable in terms of roughness density, bulky protrusions and number of protrusions. When using film having a surface roughened by these methods, furthermore, oil impregnation between film layers will not occur to a sufficient degree during a capacitor production process and, accordingly, such film layers tend to contain partially unimpregnated portions, possibly leading to a short capacitor life. The method of stretching a sheet containing a dissimilar polymer such as polyethylene does not suffer from significant residues of bubbles during formation of a capacitor, but such a dissimilar polymer can have an adverse influence during recycling of the film, possibly leading to low recyclability.

When any of the methods is used, biaxially orientated polypropylene film with a roughened surface may not have sufficient security protection properties under severe use conditions where the voltage gradient is 370 V/μm or more at high temperatures, leading to problems in terms of reliability. The voltage gradient refers to the voltage applied per unit thickness of the film.

To improve roughness density and ensure uniformity of protrusions, there are some proposals including polypropylene film having a high melt tension (see, for example, Japanese Patent Application Laid-open No. 2001-72778) and layered film containing such polypropylene film having a high melt tension stacked on common polypropylene film (see, for example, Japanese Patent Application Laid-open No. 2001-129944). If the polypropylene resin having a high melt tension is used in capacitors, it may be impossible to achieve a sufficient degree of heat resistance and withstand voltage characteristics, leading to the problem of a considerable reduction in dielectric breakdown voltage, particularly at high temperatures.

In the case of the technique of producing layered film containing polypropylene resin having a high melt tension, it is actually impossible to produce a uniform layered structure, particularly when thin film layers with a thickness of 5 μm or less are used, failing to provide dielectric film that has satisfactory practical quality.

In addition, Japanese Patent No. 3508515 proposes biaxially orientated polypropylene film having a surface with a controlled degree of roughening and a production method thereof. However, the technique proposed in JP '515 does not work sufficiently and has difficulty producing a roughed film surface with a low protrusion level.

For JP '515 and Japanese Patent Application Laid-open No. 2007-308604, furthermore, it is insisted that both good element winding properties and voltage withstanding characteristics can be realized simultaneously if an unstretched sheet with a β crystal fraction in a specific range is used to form a film in which at least one surface is a finely roughened one. The production methods disclosed in JP '515 and JP '604, however, do not work sufficiently in controlling the roughness of both surfaces of a film and, in particular, do not provide film that has a sufficiently high surface roughness to achieve a high withstand voltage, productivity, and processability required for automobile members.

There are some disclosed techniques (see, for example, Japanese Patent Application Laid-open No. 2011-122143) designed to control the roughness of both surfaces of a film in a predetermined range by adjusting the air temperature of the air knife, which works to bring an unstretched sheet in strong contact with the casting drum, to 60° C. to 120° C. during the melt-extrusion of resin material for biaxially orientated polypropylene film. However, when applied to uses that require a high withstanding voltage to allow the capacitor to have a voltage gradient of 450 V/μm or more at high temperatures, the technique disclosed in JP '143 may fail to realize a required level of security protection properties, possibly leading to problems in terms of reliability.

It could therefore be helpful to provide a biaxially orientated polypropylene film for capacitors that ensures a high withstanding voltage and reliability as well as stable productivity and element processability when applied to high voltage capacitors.

Such biaxially orientated polypropylene film for capacitors provides a biaxially orientated polypropylene film in which both surfaces are smooth and contain highly uniform protrusions suitable for production of capacitors and the like, a high roughness density, and few bulky protrusions.

SUMMARY

We thus provide:

A biaxially orientated polypropylene film for capacitor has protrusions on both surfaces and the biaxially orientated polypropylene film for capacitor is characterized by having a thickness (t1) of 1 to 3 μm, having a ten point average roughness (SRz) of 50 nm or more and less than 500 nm on both surfaces, and meeting both equations (1) and (2) given below where one surface and the other surface are referred to as a surface A and a surface B, respectively:

$$150 \leq Pa \leq 400 \tag{1}$$

$$50 \leq Pb \leq 150 \tag{2}.$$

In equations (1) and (2) given above, Pa denotes number of protrusions existing per 0.1 mm² on the surface A and Pb denotes number of protrusions existing per 0.1 mm² on the surface B.

The biaxially orientated polypropylene film for capacitor simultaneously meets both equations (3) and (4) given below:

$$0.5 \leq Pa50\text{-}250/Pa \leq 1.0 \tag{3}$$

$$0.5 \leq Pb50\text{-}250/Pb \leq 1.0 \tag{4}.$$

In equations (3) and (4) given above, Pa50-250 denotes number of protrusions with a height of 50 nm or more and less than 250 nm existing per 0.1 mm² on the surface A and Pb50-250 denotes the number of protrusions with a height of 50 nm or more and less than 250 nm existing per 0.1 mm² on the surface B.

The biaxially orientated polypropylene film for capacitor has a center line average roughness (SRa) of 10 nm or more and 30 nm or less on both the surfaces.

The biaxially orientated polypropylene film for capacitor has a ten point average roughness (SRz) of 50 nm or more and 400 nm or less on both the surfaces.

The biaxially orientated polypropylene film for capacitor contains 0.05 mass % to 10 mass % of a branched polypropylene (H).

A metalized film includes the biaxially orientated polypropylene film for capacitor described above and a metal layer provided on at least one surface thereof.

In addition, the metalized film includes the metal layer having a surface electric resistivity in the range of 1 to 20 Ω/□.

A film capacitor, furthermore, is characterized by including any of the metalized film described above.

We provide biaxially orientated polypropylene film for capacitors in the form of thin film having good surface characteristics, good processing suitability, and high voltage withstanding characteristics over a wide range of atmospheric temperature conditions from low temperatures (−40° C.) to high temperatures (105° C.). The film is particularly suitable for producing capacitors that work favorably in automobiles, photovoltaic power generators, and wind power generators.

DETAILED DESCRIPTION

Our biaxially orientated polypropylene film has protrusions on both surfaces and a thickness (t1) of 1 to 3 μm. The thickness t1 (μm) is measured with a micrometer as described later.

The biaxially orientated polypropylene film is biaxially orientated polypropylene film that has a ten point average roughness (SRz) of 50 nm or more and less than 500 nm on both surfaces, and meets both equations (1) and (2) where one surface and the other surface are referred to as a surface A and a surface B, respectively:

$$150 \leq Pa \leq 400 \tag{1}$$

$$50 \leq Pb \leq 150 \tag{2}$$

wherein Pa denotes the number of protrusions existing per 0.1 mm² on the surface A and Pb denotes the number of protrusions existing per 0.1 mm² on the surface B.

First, the physical characteristics of the biaxially orientated polypropylene film are described below.

From the viewpoint of capacitor element size and film production stability, the biaxially orientated polypropylene film preferably has a thickness (t1) of 1 to 3 μm as measured with a micrometer. If protrusions exist, the film thickness (t1) measured with a micrometer includes their heights and, accordingly, it represents the maximum thickness of the film. The film may be inferior in mechanical strength and dielectric breakdown strength if the thickness (t1) is too small. If the film thickness (t1) is too large, on the other hand, the film may have difficulty in developing a uniform thickness during its production and lead to a small capacity per unit volume when used as dielectric material in a capacitor.

The biaxially orientated polypropylene film has a ten point average roughness (SRz) of 50 nm or more and less than 500 nm on both the surfaces. If the ten point average roughness (SRz) is less than 50 nm, air may not be removed completely to cause inferior winding-up of the film and may easily suffer from flaws, which can lead to defects, during conveyance in the deposition step, slitting step, or capacitor element winding step. During the capacitor element winding step, in particular, creases may be formed easily, and decreased interlayer gaps may occur to cause local interlayer contact easily, leading to electric field concentration that can cause a decrease in withstand voltage. If the ten point average roughness (SRz) is 500 nm or more, the minimum film thickness may decrease and accordingly, the withstand voltage will decrease. The ten point average roughness (SRz) is more preferably 50 to 450 nm, particularly preferably 50 to 400 nm, which can improve the wind-up performance during the slitting step and capacitor element winding step, leading to film with high processability.

The biaxially orientated polypropylene film meets the equations (1) and (2) where one surface and the other surface are referred to as the surface A and the surface B, respectively:

$$150 \leq Pa \leq 400 \tag{1}$$

$$50 \leq Pb \leq 150 \tag{2}$$

wherein Pa denotes the number of protrusions existing per 0.1 mm² on the surface A and Pb denotes the number of protrusions existing per 0.1 mm² on the surface B.

If the number of protrusions per unit area is smaller than a predetermined value, that is, if the value of Pa is less than 150 and/or the value of Pb is less than 50, in equations (1)

and (2), air may not be removed completely to cause inferior winding-up of the film and may easily suffer from flaws, which can lead to defects, during conveyance in the deposition step, slitting step, or capacitor element winding step. During the capacitor element winding step, in particular, low slipperiness may cause creases easily during conveyance, and decreased interlayer gaps may occur to cause local interlayer contact easily, leading to electric field concentration that can cause a decrease in withstand voltage. If the number of protrusions per unit area is more than a predetermined value, that is, if the value of Pa is more than 400 and/or the value of Pb is more than 150, the minimum film thickness may decrease and accordingly, the withstand voltage will decrease.

Furthermore, the biaxially orientated polypropylene film preferably simultaneously meets equations (3) and (4):

$$0.5 \leq Pa50\text{-}250/Pa \leq 1.0 \quad (3)$$

$$0.5 \leq Pb50\text{-}250/Pb \leq 1.0 \quad (4)$$

wherein Pa50-250 denotes the number of projections with a height of 50 nm or more and less than 250 nm existing per 0.1 $mm^2$ on the surface A and Pb50-250 denotes the number of projections with a height of 50 nm or more and less than 250 nm existing per 0.1 $mm^2$ on the surface B.

In equations (3) and (4), the proportions of protrusions with a height of 50 nm or more and less than 250 nm existing on the surface A and the surface B, that is, the ratios of Pa50-250/Pa and Pb50-250/Pb, are preferably 0.55 or more and 1.0 or less, more preferably 0.6 or more and 1.0 or less. If Pa50-250/Pa or Pb50-250/Pb is less than 0.5, the protrusions will be too low or too high and, accordingly, the interlayer gaps in capacitors formed of the film will be too small or too large. If the interlayer gaps in the film is too small, oil impregnation between film layers will not occur to a sufficient degree during production of an impregnation type capacitor and, accordingly, the film layers will tend to contain partially unimpregnated portions, leading to a short capacitor life. If the interlayer gaps in the film is too large, the minimum film thickness will decrease and accordingly, the withstand voltage tends to decrease.

Furthermore, the center line average roughness (SRa) on each surface of the biaxially orientated polypropylene film is preferably 10 to 30 nm, more preferably 15 to 25 nm. If the center line average roughness (SRa) is more than 30 nm, air will be easily caught up between layers in a layered film, possibly leading to degradation of the capacitor element. When a metal layer is formed on the film, holes and the like may be formed in the metal layer, leading to a decrease in dielectric breakdown voltage and element life at high temperatures, or electric charge concentration may occur when a voltage is applied, possibly leading to insulation defects. If the center line average roughness (SRa) is less than 10 nm, the film may be extremely low in slipperiness, possibly leading to low handleability, or insulation oil will not penetrate uniformly between the layers of the film during impregnation of a capacitor element with insulation oil, possibly leading to large changes in capacity during continuous use.

For the biaxially orientated polypropylene film, the ratio of the ten point average roughness (SRz) to the center line average roughness (SRa) is preferably in a certain range. Specifically, for each layer, the ratio of the ten point average roughness (SRz) to the center line average roughness (SRa) is preferably 3 to 20, more preferably 5 to 18, and particularly preferably 8 to 15.

If this ratio (SRz/SRa) is too large, bulky protrusions accounts for a larger proportion and air will be caught up between the layers in a layered film, possibly leading to degradation of the capacitor element. When a metal layer is formed on the film, holes may be formed in the metal layer, leading to a decrease in dielectric breakdown voltage and element life at high temperatures. If this ratio (SRz/SRa) is too small, it may lead to deterioration in handleability and stability during film conveyance.

The biaxially orientated polypropylene film, which has surface protrusions as specified above, has a distinctive surface with high uniformity and highly uniform roughness density. If this biaxially orientated polypropylene film is used to produce a capacitor, dielectric breakdown, if it occurs, will not lead to short-circuit breakdown because moderate clearance is maintained between film layers, allowing a long capacitor life and stable security protection properties.

The height of protrusions, number of protrusions, ten point average roughness (SRz), center line average roughness (SRa) or the like, described above can be measured according to JIS B-0601 (1982) using a noncontact three dimensional fine surface profile analyzer (ET-30HK) and three dimensional roughness analyzer (Model SPA-11) manufactured by Kosaka Laboratory Ltd. Details including measuring conditions will be described later.

The biaxially orientated polypropylene film preferably has a surface with a glossiness of 125% to 145%, more preferably 130% to 140%. A decrease in glossiness means denser irregularities on the film surface. The number of protrusions per unit area increases, leading to a higher roughness density. If the glossiness is decreased to less than 125%, the number of protrusions and the height of protrusions will increase, possibly leading to a capacitor with a decreased withstand voltage at high temperatures. If the glossiness is more than 145%, on the other hand, it will be difficult to mold a flattened-shaped capacitor element due to a very low slipperiness between film layers, and a sufficient clearance may not be maintained between film layers, possibly leading to serious deterioration in security protection properties.

The biaxially orientated polypropylene film preferably has a surface wet tension of 37 to 50 mN/m, more preferably 39 to 48 mN/m, at least on one surface. Polypropylene film commonly has a surface wet tension of about 30 mN/m, but the surface wet tension can be increased by, for example, corona discharge treatment, plasma treatment, glow treatment, and flame treatment. If at least one surface has a surface wet tension of 37 mN/m or more, it can strongly adhere to metal film and provides a capacitor with enhanced security protection properties.

Described next are straight polypropylene and other materials used to produce the biaxially orientated polypropylene film.

Straight polypropylene, which is the main material for the biaxially orientated polypropylene film, has been commonly used for packaging and capacitors. The straight polypropylene is preferably a polypropylene having a cold xylene soluble (CXS) fraction of 4 mass % or less and a mesopentad fraction of 0.95 or more. If this requirement is not met, the material may be inferior in film production stability, may suffer from formation of voids when processed into biaxially orientated film, or may be poor in dimensional stability and dielectric breakdown resistance characteristics.

Straight polypropylene preferably has a cold xylene soluble (CXS) fraction of 4 mass % or less, more preferably 3 mass % or less, and particularly preferably 2 mass % or less. The cold xylene soluble (CXS) fraction is the proportion of the polypropylene components dissolved in xylene that is determined by completely dissolving polypropylene in xylene and then precipitating it at room temperature, which are thought to be low crystallizability components such as low stereoregularity components and low molecular weight components. A cold xylene soluble (CXS) fraction of more than 4 mass % may lead to problems such as deterioration in film's thermal dimensional stability and a decrease in dielectric breakdown voltage at high temperatures.

Straight polypropylene preferably has a mesopentad fraction of 0.95 or more, more preferably 0.97 or more. The mesopentad fraction is an indicator that represents the stereoregularity of the crystalline phase in polypropylene measured by nuclear magnetic resonance analysis (NMR analysis) and larger measurements suggest a higher degree of crystallinity, higher melting point, and higher dielectric breakdown voltage at high temperatures. There are no specific limitations on the upper limit of the mesopentad fraction. Preferred methods of producing such high-stereoregularity straight polypropylene include a method in which powder of polypropylene resin is washed with a solvent such as n-heptane, a method that uses an appropriately selected catalyst and/or promoter, and a method that adopts an appropriately selected composition.

Straight polypropylene has a melt flow rate (MFR) of 1 to 10 g/10 min (230° C., 21.18 N load), particularly preferably 2 to 5 g/10 min (230° C., 21.18 N load). Control of the melt flow rate (MFR) of straight polypropylene in the above range is realized by, for example, controlling the average molecular weight and molecular weight distribution.

Straight polypropylene is composed mainly of a propylene homopolymer, but the straight polypropylene may contain copolymer components of other unsaturated hydrocarbons unless they impair the desired characteristics. In addition, resin material used for the biaxially orientated polypropylene film may be a blend of straight polypropylene with a copolymer of propylene and other unsaturated hydrocarbons. Useful copolymer components and monomer components of such a blend include, for example, ethylene, propylene (for a copolymerized blend), 1-butene, 1-pentene, 3-methylpentene-1,3-methylbutene-1,1-hexene, 4-methylpentene-1,5-ethylhexene-1,1-octene, 1-decene, 1-dodecene, vinyl cyclohexene, styrene, allyl benzene, cyclopentene, norbornene, and 5-methyl-2-norbornene. In regard to the copolymerization rate and blending rate, it is preferable that the copolymerization rate be less than 1 mol % and the blending rate be less than 10 mass % from the viewpoint of dielectric breakdown resistance and dimensional stability.

Furthermore, straight polypropylene may also contain various additives (such as crystal nucleating agent, antioxidant, thermal stabilizer, lubricant, antistatic agent, antiblocking agent, filler, viscosity adjustor, and color protection agent) unless they impair the desired characteristics.

If an antioxidant, among other additives, is to be used, it is important to identify the appropriate type and quantity of it from the viewpoint of long term heat resistance. Specifically, when an antioxidant is used, it is preferable to adopt a phenolic type one that has an effect of steric hindrance, and if a plurality of antioxidants are used in combination, at least one of them is preferably a high-molecular weight type one with a molecular weight of 500 or more. Various specific examples can be given as such antioxidants, but, for example, it is preferable to use 2,6-di-t-butyl-p-cresol (BHT: molecular weight 220.4) in combination with 1,3,5-trimethyl-2,4,6-tris-(3,5-di-t-butyl-4-hydroxybenzyl) benzene (for example, Irganox (registered trademark) 1330, manufactured by BASF, molecular weight 775.2) or tetrakis [methylene-3(3,5-di-t-butyl-4-hydroxyphenyl)propionate] methane (for example, Irganox (registered trademark) 1010 manufactured by BASF, molecular weight 1177.7). The total content of these antioxidants is preferably 0.03 to 1.0 mass % of the total quantity of polypropylene. The long term heat resistance may deteriorate if the antioxidant content is too small. If the antioxidant content is too large, bleed-out of these antioxidants may cause blocking at high temperatures, possibly having an adverse influence on the capacitor element. The content is more preferably 0.1 to 0.9 mass % and particularly preferably 0.2 to 0.8 mass %.

Straight polypropylene may contain a crystal nucleating agent unless it impairs the desired characteristics. Such crystal nucleating agents include, for example, α-crystal nucleating agents (dibenzylidene sorbitols, sodium benzoate and the like), β-crystal nucleating agents (1,2-hydroxystearate potassium, magnesium benzoate, N,N'-dicyclohexyl-2,6-naphthalene dicarboxamide, other amide-based compounds, quinacridone-based compounds), and branched polypropylene (H) as described later. As a crystal nucleating agent, it is preferable to add a branched polypropylene (H) that can serve as an α- or β-crystal nucleating agent. For the biaxially orientated polypropylene film, the addition of an α-nucleating agent or a β-nucleating agent other than the branched polypropylene (H) may make it difficult to achieve an intended surface roughness or may have adverse effects on electric characteristics such as deterioration in volume resistivity at high temperatures. Such an agent should preferably account for less than 0.1 mass % and should more preferably be substantially absent.

The biaxially orientated polypropylene film preferably contains branched polypropylene (H) and more preferably consists of a mixture of straight polypropylene and branched polypropylene (H). In this case, the branched polypropylene (H) preferably meets formula (5) for the melt tension (MS) and melt flow rate (MFR) measured at 230° C.:

$$\log(MS) > -0.56 \log(MFR) + 0.74 \quad (5).$$

The melt tension measured at 230° C. is determined from the melt flow rate (MFR) measured according to JIS-K7210 (1999). Specifically, polypropylene is heated to 230° C. using a melt tension tester manufactured by Toyo Seiki Seisaku-sho, Ltd. and the melted polypropylene is discharged at an extrusion speed of 15 mm/min to produce a strand. As this strand is taken up at a speed of 6.4 m/min, the tension is measured to represent the melt tension (unit cN). In addition, the melt flow rate (MFR) measured at 230° C. is determined according to JIS-K7210 (1999) under a load of 21.18 N (unit g/10 min).

There are no specific limitations on the branched polypropylene (H), although it preferably meets formula (5). From the viewpoint of film production performance, the melt flow rate (MFR) is preferably 1 to 20 g/10 min, more preferably 1 to 10 g/10 min. Furthermore, the branched polypropylene (H) preferably has a melt tension 1 to 30 cN, more preferably 2 to 20 cN. If the melt tension is too small, the protrusions will be low in uniformity and the ratio (SRz/SRa) between the ten point average roughness (SRz) and the center line average roughness (SRa) will be so large that bulky protrusions will be formed easily. As the melt tension increases, the protrusions will be higher in uniformity and the ratio (SRz/SRa) tends to decrease, easily leading to the formation of a dense surface (an increase in the number of protrusions per unit area).

If the biaxially orientated polypropylene film contains branched polypropylene (H), the melt crystallization temperature of the polypropylene, which is commonly about 110° C., can be increased to 115° C. or more. If dielectric film undergoes dielectric breakdown for some reason, electrical discharge energy will be generated to evaporate the deposited metal in and around the part where the electrical discharge is taking place and the film itself may be melted partially. Commonly, if the atmosphere temperature around a capacitor is high, recrystallization will not occur easily and insulating properties will not be restored easily, but if branched polypropylene (H) is added, the melt crystallization temperature will become so high that recrystallization will be promoted to improve the security protection properties.

To produce branched polypropylene (H) with a melt tension (MS) and melt flow rate (MFR) measured at 230° C. that meet formula (5) given above, available methods include a method of adding an oligomer or polymer that has a branched structure, a method of introducing a branched long chain structure into the polypropylene molecule as described in Japanese Unexamined Patent Publication (Kokai) No. SHO 62-121704, and a method as described in Japanese Patent No. 2869606. Specific examples of branched polypropylene (H) that meets formula (5) given above include Profax PF-814 manufactured by Basell and Daploy HMS-PP (for example, WB130HMS and WB135HMS) manufactured by Borealis, of which PF-814, which is produced by electron beam crosslinking, is preferred because of small gel contents in the resin. The branched polypropylene (H) to be added to the biaxially orientated polypropylene film preferably has five or less internal trisubstituted olefins per every 10,000 carbon atoms. The existence of such an internal trisubstituted olefin can be examined based on the proton ratio in the $^1$H-NMR spectrum.

In the biaxially orientated polypropylene film, branched polypropylene (H) with a melt tension (MS) and melt flow rate (MFR) measured at 230° C. that meet formula (5) is preferably contained at 0.05 to 10 mass %, more preferably 0.5 to 8 mass %, and still more preferably 1 to 5 mass %. If the content of the branched polypropylene (H) is less than 0.05 mass %, the proportion of bulky protrusions may increase and the withstand voltage of the film may decrease. If the content of the branched polypropylene (H) is more than 10 mass %, on the other hand, the craters on the film surface may be too small, possibly leading to the formation of a smooth surface with a low element processability.

If the biaxially orientated polypropylene film is composed of straight polypropylene and branched polypropylene (H), the melting point curve taken by the method described later has at least two melting peaks when observed in the second-run mode. Specifically, the first melting peak (at a temperature of 160° C. to 172° C.) is accompanied by a shoulder peak (148° C. to 157° C.). This suggests that uniform protrusions exist to facilitate the formation of a dense surface with few bulky protrusions. Furthermore, if branched polypropylene (H) accounts for a proportion as described above in the biaxially orientated polypropylene film, the biaxially orientated polypropylene film will have a distinctive surface that is high in protrusion uniformity and free of bulky protrusions and also have a high processability and high withstand voltage in a wide range of ambient temperature conditions from −40° C. to above 105° C.

Furthermore, the biaxially orientated polypropylene film preferably has an ash content of 50 ppm or less (by mass, hereinafter the same), more preferably 30 ppm or less, and particularly preferably 20 ppm or less. If the ash content is too large, the film may deteriorate in dielectric breakdown resistance, possibly leading to a decrease in dielectric breakdown voltage. To allow the ash content to be in this range, it is important to use materials containing little amounts of catalyst residues, and such a content can be achieved by, for example, minimizing the contamination from the extrusion system during film production, which may be realized by thoroughly cleaning the paths with the polymer for a bleeding time of one hour or more before actually starting the film production process.

Described next are techniques to produce protrusions on the surface of the biaxially orientated polypropylene film.

A technique of utilizing crystalline modification can be used to form protrusions on the surface of the biaxially orientated polypropylene film. This technique is preferred because it does not need the addition of impurities and accordingly, electric characteristics such as dielectric breakdown voltage are less likely to deteriorate compared to the methods that adopt the addition of resin or inorganic and/or organic particles that are incompatible with polypropylene. Described below are surface profiles that can be produced by crystalline modification.

The method of surface formation by crystalline modification referred to herein is the technique of forming a surface by utilizing two crystal systems of polypropylene as described in references (e.g., M. Fujiyama et al., journal of Applied Polymer Science 36, p. 985-1048 (1998)). First, α-spherulites (monoclinic, crystal density 0.936 g/cm$^2$) and β-spherulites (hexagonal, crystal density 0.922 g/cm$^2$) are formed on an unstretched sheet, which is stretched to allow the thermally unstable β-spherulites to undergo crystalline modification into α-spherulites, thereby producing irregularities on the film surface.

The surface irregularities, that is, the protrusions, that are produced by the surface formation method that uses crystalline modification have a circular arc crater shape. Specifically, convex regions aligned along a circle or ellipse are observed. The longitudinal and lateral size of the crater shape depends on the draw ratio between the longitudinal and lateral stretching in the biaxial stretching step. It is nearly circular when the film is stretched isotropically at a longitudinal to lateral ratio of 1 while it is flattened with an increasing longitudinal to lateral ratio. Commonly, craters formed by sequential biaxial stretching have the major axis in the lateral direction of the film (in the width direction of the film roll). Depending on the mechanism of the spherulite formation, a plurality of craters of different shapes may overlap or they may have arch-like or half-arc shapes instead of closed circles.

For the biaxially orientated polypropylene film, an effective technique to produce a distinctive surface profile is to add a material that can serve as a nucleating agent to enhance the nuclei forming ability, increase the number of nuclei, and form a surface that contains a large number of small, fine protrusions that cover the surface uniformly, with a smaller area occupied by relatively flat regions. An example of such a material that serves as a nucleating agent is the branched polypropylene (H) described above. The crater shape described above can be controlled by changing the content of the branched polypropylene (H) and the film production conditions. As a result, distinctive irregularities can be produced on the surface of the biaxially orientated polypropylene film.

The biaxially orientated polypropylene film can be produced by using a material having characteristics as described above and performing a biaxial stretching step. Useful biaxial stretching methods include inflation simultaneous biaxial stretching, stenter simultaneous biaxial stretching, and stenter sequential biaxial stretching, of which the stenter sequential biaxial stretching technique is preferred from the viewpoint of production stability, thickness uniformity, and film's surface profile control.

Described below is a process of producing the biaxially orientated polypropylene film, but it should be noted that this disclosure is not limited thereto.

First, straight polypropylene is mixed with branched polypropylene (H) at a predetermined ratio and the mixture is melt-extruded, filtrated through a filter, extruded through a T-die at a temperature of 230° C. to 260° C., and solidified on a cooling drum to provide an unstretched sheet. To produce the biaxially orientated polypropylene film, it is necessary here to allow β-crystals to be formed properly, and for the proper formation of β-crystals, the temperature of the cooling drum should be controlled appropriately. To produce β-crystals efficiently, it is preferable for the resin to be maintained for a predetermined time at a temperature where the β-crystal formation efficiency is maximized and such a temperature is commonly in the range of 115° C. to 135° C. The retention time is preferably one second or more. To realize such conditions, the process may be appropriately controlled taking into consideration the resin temperature, extrusion rate, take-up speed, etc., but it is preferable from the viewpoint of productivity for the cooling drum to have a diameter of at least 1 m or more because the diameter of the drum has a large influence on the retention time. Furthermore, the cooling drum selected preferably has a temperature of 60° C. to 110° C., more preferably 70° C. to 100° C., and particularly preferably 75° C. to 90° C. If the temperature of the cooling drum is more than 110° C., the β-crystal formation will proceed to an excessive degree to allow voids to be generated in the film, possibly leading to deterioration in dielectric breakdown resistance characteristics. If the temperature of the cooling drum is less than 60° C., on the other hand, β-crystals may not be formed, possibly leading to the formation of a smooth surface that is inferior in element processability.

Useful methods to bring the unstretched sheet into strong contact with the cooling drum include the application of static electricity, use of surface tension of water, air knife method, press roll method, and casting into water, of which the air knife method is preferred because it can produce a highly planar surface and control the surface roughness.

If the air knife method is implemented under common conditions as performed conventionally, however, it is very difficult to control formation of β-crystals on the non-drum side of the unstretched sheet, that is, the surface not in contact with the cooling drum. Accordingly, a preferred technique to obtain the biaxially orientated polypropylene film is to use a heater, cooler or the like, to increase or decrease the air temperature of the air knife, which is acting to maintain the contact with the cooling drum to allow air at a controlled predetermined temperature to be applied. This makes it possible to control the temperature of the non-drum side of the unstretched sheet to allow the non-drum side of the unstretched sheet to have a heat history similar to that of the drum side of the unstretched sheet or also allow them to have largely different heat histories. Thus, this makes it possible to control separately the crystal growth in each surface of the unstretched sheet. Accordingly, the degree of roughening of each surface of the biaxially orientated polypropylene film can be controlled to achieve the desired surface roughness.

Furthermore, the air knife preferably has an air temperature of 0° C. to 40° C., more preferably 5° C. to 35° C., and particularly preferably 10° C. to 30° C.

If the air temperature of the air knife is too high, the film may undergo crystallization to an excessive degree, making it difficult to perform stretching in subsequent steps, or may undergo void formation, leading to deterioration in the dielectric breakdown resistance characteristics. If the air temperature of the air knife is too low, on the other hand, crystal growth may not proceed sufficiently, making it difficult to achieve a surface roughness.

The difference between the temperature of the cooling drum and the air temperature of the air knife is preferably 50° C. to 100° C., more preferably 55° C. to 90° C., and particularly preferably 60° C. to 80° C. If the difference between the temperature of the cooling drum and the air temperature of the air knife is less than 40° C., the number of protrusions may not differ significantly between the two surfaces. If the difference between the temperature of the cooling drum and the air temperature of the air knife is more than 100° C., on the other hand, film formation on the cooling drum may become unstable, possibly making it difficult to carry out the subsequent conveyance step or stretched step.

The air knife preferably feeds air at a speed of 130 to 150 m/s and also preferably has a double pipe structure to ensure improved uniformity in the width direction. Required contact with the cooling drum will not be achieved and film production will not proceed properly if the air speed is less than 130 m/s whereas if it is more than 150 m/s, uniform contact will not be maintained, easily leading to problems such as low film production performance, uneven quality, and uneven thickness. Furthermore, it is preferable for the position of the air knife to be adjusted so that the air will not flow downstream in the film production, thereby preventing avoid vibration of the film.

Then, this unstretched sheet is stretched biaxially. First, the unstretched sheet is preheated by passing it between rolls maintained at 120° C. to 150° C. Following this, the sheet is stretched 2 to 8 times, preferably 3 to 7 times, in the length direction at 130° C. to 150° C., preferably 135° C. to 145° C., followed by cooling to room temperature. Subsequently, the stretched film was introduced into a stenter and stretched 7 to 13 times, preferably 8 to 12 times, in the width direction at 140° C. to 160° C., preferably 150° C. to 158° C. Then, while relaxing the film by 2% to 20% in the width direction, heat fixation is performed at a temperature of 140° C. to 160° C. to provide the biaxially orientated polypropylene film.

The biaxially orientated polypropylene film is preferred as a dielectric film for capacitors, though not limited any specific capacitor type. Specifically, in regard to the electrode structure, it can be applied to wound foil capacitors, metal vapor deposited film capacitors, oil impregnated capacitors, which are impregnated with insulating oil, and dry capacitors, which are completely free of insulating oil. In regard to the shape, furthermore, it can be applied to either wound type or lamination type capacitors, but from the viewpoint of its characteristics, the film is preferred for production of metal vapor deposited film capacitors.

To produce metallized film composed of the biaxially orientated polypropylene film provided with metal film, the surface to be covered with metal film is subjected to corona discharge treatment in atmosphere, nitrogen, carbon dioxide gas, or a mixed gas thereof, at a treatment strength 20 to 30 W·min/m$^2$ to ensure good adhesion to deposited metal.

There are no specific limitations on the method to be used to produce metalized film by forming metal film on the surface of the biaxially orientated polypropylene film, a preferred technique is, for example, to deposit aluminum on at least one side of polypropylene film, thus producing metal film such as aluminum vapor deposited film to serve as internal electrode of a film capacitor. In this instance, another metal component such as, for example, nickel, copper, gold, silver, chromium, and zinc may be deposited simultaneously with or subsequent to aluminum deposition. In addition, a protective layer of oil or the like may be formed on the vapor deposited film.

From the viewpoint of electric characteristics and self-healing properties of intended film capacitors, the metal film formed on the surface of the biaxially orientated polypropylene film preferably has a thickness of 20 to 100 nm. For similar reasons, furthermore, the metal film preferably has a surface electric resistivity of 1 to 20Ω/□. The surface electric resistivity can be controlled by selecting an appropriate type of metal and adjusting its film thickness. Details of measurement of the surface electric resistivity will be described later.

Formation of metal film may be followed, as required, by ageing treatment or heat treatment of the metalized film at a specific temperature. For insulation or other purposes, furthermore, at least one surface of the metalized film may be coated with, for example, polyphenylene oxide. Metalized film thus obtained may be laminated or wound by various methods to provide film capacitors. A preferred production method for wound type film capacitors is described below.

Metal film is deposited on the biaxially orientated polypropylene film while leaving marginal spaces that are free of metal deposition. A knife is put into the center of each marginal space and the center of each metal deposited area to slit the film into a tape-like shape and wound up to provide a roll of a tape having a marginal space along one, either right- or left-hand, edge. The tape from the wound roll with a margin on the left-hand edge and the tape from the wound roll with a margin on the right-hand edge are put one on top of the other such that the metal deposited area sticks out of the marginal space in the width direction, and then they are wound up. After removing the core, the resulting wound-up body is pressed and an external electrode is formed at each end face by thermal metal spraying, followed by welding a lead wire to each external electrode to provide a wound type film capacitor.

Film capacitors have been used in a variety of fields including railroad vehicles, automobiles (hybrid cars, electric vehicles), photovoltaic power generation, wind power generation, and general home electric appliances, and the film capacitor produced as described above can also be applied favorably to these uses. In particular, it is favored as members of inverter circuits for hybrid cars in which they are required to have high withstand voltage characteristics.

The methods for measurement of characteristic values and methods for evaluation of effects are as described below.

(1) Thickness of Film (μm)

A micrometer was used to measure the thickness according to 7.4.1.1. of JIS C-2330 (2001).

(2) Glossiness (Degree of Glossiness)

According to JIS K-7105 (1981), a digital variable gloss meter (UGV-5D, manufactured by Suga Test Instruments Co., Ltd.) was used under the conditions of an incidence angle of 60° and a light receiving angle of 60° to take five measurements, followed by averaging them to provide a value to represent the degree of glossiness.

(3) Melt Flow Rate (MFR)

According to JIS-K7210 (1999), measurements were taken at a temperature of 230° C. and a load of 21.18 N.

(4) Melt Tension (MS)

Measurements were taken using a MFR measuring apparatus according to JIS-K7210 (1999). Polypropylene was heated to 230° C. using a melt tension tester manufactured by Toyo Seiki Seisaku-sho, Ltd. and the melted polypropylene was discharged at an extrusion speed of 15 mm/min to produce a strand. As this strand was taken up at a speed of 6.5 m/min, the tension was measured to provide a value to represent the melt tension.

(5) Melting Point and Melt Crystallization Temperature (° C.)

Measurements were taken under the following conditions using a differential scanning calorimeter (RDC220, manufactured by Seiko Electronics industrial Co., Ltd.).

Preparation of Specimens

A specimen weighing 5 mg was enclosed in an aluminum pan for measurement. In the case of film covered with deposited metal or the like, it is removed appropriately.

Measurement

The film is melted, recrystallized, and remelted in the following steps (a), (b), and (c). Of the plurality of melting peaks observed in the second run, the melting peak appearing at the highest temperature was examined and its peak temperature was adopted as the melting point of the resin. Then, of the plurality of crystallization peaks observed in the subsequent cooling step, the peak appearing at the highest temperature was examined and its peak temperature was adopted as the melt crystallization temperature.

Three measurements were taken and their average was adopted as the melting point.

(a) First run: heating from 30° C. to 280° C. (heating rate 20° C./min)
(b) Cooling: maintained at 280° C. for 5 minutes, followed by heating from 280° C. to 30° C. (cooling rate 20° C./min)
(c) Second run: heating from 30° C. to 280° C. (heating rate 20° C./min)

(6) Mesopentad Fraction (mmmm)

A specimen was dissolved in a solvent and the mesopentad fraction (mmmm) was determined under the following conditions using $^{13}$C-NMR.

A. Measuring Conditions

Equipment: DRX-500, manufactured by Bruker
Nucleus for measurement: $^{13}$C nucleus (resonance frequency: 125.8 MHz)
Measuring concentration: 10 wt %
Solvent: a solution of benzene and deuterated orthodichlorobenzene mixed at a mass ratio of 1:3
Measuring temperature: 130° C.
Spin rotating speed: 12 Hz
NMR specimen tube: 5 mm tube
Pulse width: 45° (4.5 μs)
Pulse repeating time: 10 seconds
Data point: 64K
Number of conversions: 10,000
Measuring mode: complete decoupling B. Analysis Conditions Fourier conversion was performed for a LB (line broadening factor) of 1.0 and the mmmm peak was set to 21.86 ppm. Peak division was performed using WINFIT software (supplied by Bruker). In doing this, peak division was performed from the peak at the highest magnetic field strength as described below. After conducting automatic fitting by use of attached software and optimizing the peak division, the sum of the peak fractions of mmmm and ss (spinning side band peak of mmmm) was calculated to provide a value to represent the mesopentad fraction (mmmm).

Five measurements were taken and their average was calculated to determine the mesopentad fraction.

Peaks
- (a) mrrm
- (b) (c) rrrm (divided into two peaks)
- (d) rrrr
- (e) mrmm+rmrr
- (f) mmrr
- (g) mmmr
- (h) ss (spinning side band peak of mmmm)
- (i) mmmm
- (j) rmmr (7) Number of Internal Trisubstituted Olefins A specimen was dissolved in a solvent and the number of internal trisubstituted olefins was determined under the following conditions using $^1$H-NMR.

A. Measuring Conditions
  Equipment: Nuclear magnetic resonance spectrometer, JNM-ECX400P, manufactured by JEOL Ltd.
  Nucleus for measurement: $^1$H nucleus (resonance frequency: 500 MHz)
  Measuring concentration: 2 wt %
  Solvent: deuterated orthodichlorobenzene
  Measuring temperature: 120° C.
  Pulse width: 45°
  Pulse repeating time: 7 seconds
  Number of conversions: 512
  Measuring mode: non-decoupling B. Analysis Conditions On the basis of the chemical shift of orthodichlorobenzene of 7.10 ppm, the signals of 5.0 to 5.2 ppm are assumed to be attributable to the protons of internal trisubstituted olefins and the proton ratio of the internal trisubstituted olefins is determined from the integration ratio of the above signals to the broad signals of 0.5 to 2.0 ppm.

(8) Cold Xylene Soluble (CXS) Fraction

A 0.5 g specimen polypropylene film is dissolved in 100 ml of boiling xylene, left to stand to cool, recrystallized in a constant temperature bath at 20° C. for one hour, followed by filtration and determining the weight (X (g)) of the polypropylene components dissolved in the filtrate by chromatography. Calculation is made by the following equation using an accurately measured weight (X0 (g)) of the 0.5 g specimen:

$$CXS(mass\ \%) = (X/X0) \times 100.$$

(9) Center Line Average Roughness (SRa) and Ten Point Average Roughness (SRz)

Measurements were taken according to JIS B-0601 (1982) using a noncontact three dimensional fine surface profile analyzer (ET-30HK) and three dimensional roughness analyzer (MODEL SPA-11) manufactured by Kosaka Laboratory Ltd. The measuring run was repeated 10 times in the length direction and the average was used to calculate the center line average roughness (SRa), ten point average roughness (SRz), total number of protrusions, number of protrusions, and the ratio of SRz/SRa. Detailed conditions and data processing used for each run were as described below.

(a) Total Number of Protrusions, Pa and Pb (Unit: Number Per 0.1 mm$^2$)

Measurements taken by the above apparatus are obtained as a histogram of 50 nm intervals. For example, if protrusions of 100 nm or more and less than 150 nm are detected, they are categorized into a group with a slice value (Z) of 150 nm. The total number of protrusions on a surface A or a surface B (Pa or Pb) is the sum of the values per 0.1 mm$^2$ converted from the number protrusions detected at a sampling intervals in the width direction and length of direction given in the paragraphs specifying the measuring conditions. The surface A is the drum-side surface that is in contact with the cooling drum while the surface B is the non-drum-side surface that is not in contact with the cooling drum. Specifically, it is the total of the counted numbers detected in the histogram. The number on the surface A and that on the surface B are expressed as Pa and Pb, respectively.

(b) Number of Protrusions in the Range of 50 nm or More and Less than 250 nm, Pa50-250 and Pb50-250 (Unit: Number Per 0.1 mm$^2$)

For the surface A or the surface B, the number of all protrusions in the height range of 50 nm or more and less than 250 nm detected in the histogram is summed up. Specifically, it is the sum of the counted numbers for the groups with slice values (Z) of 100 to 250.

Measuring Conditions
  Treatment of measuring surface: Aluminum was vacuum-deposited on the measuring surface for noncontact observation.
  Measuring direction: width direction of film
  Feeding speed in the width direction: 0.1 mm/sec
  Measuring area (width direction×length direction): 1.0 mm×0.249 mm
  Reference plane for height-direction size: LOWER (lower side)
  Sampling interval in width direction: 2 μm
  Sampling interval in length direction: 10 μm
  Number of sampling lines in length direction: 25
  Cut-off: 0.25 mm/sec
  Magnification in width direction: 200
  Magnification in length direction: 20,000
  Undulation and roughness cut: none Measuring Method A dedicated sample holder is used when measuring the number of protrusions on a film surface. The sample holder is composed of two detachable metal plates with a circular hole at the center. A sample was sandwiched between them and the film was stretched in four directions and fixed at the corners of the sample holder, followed by measuring the surface roughness of the film in the central circular part.

Results of Measurement: Data Processing

Typical results of measurement made by the above method are shown in Table 1. In the data given in Table 1, the parameters are as described below:

Surface A
  SRa: 28 nm
  SRz: 428 nm
  Pa50-250: 220/0.1 mm$^2$ (round off the first decimal place)
  Pa: 355/0.1 mm$^2$ (round off the first decimal place)

Surface B
  SRa: 20 nm
  SRz: 403 nm
  Pb50-250: 89/0.1 mm$^2$ (round off the first decimal place)
  Pb: 131/0.1 mm$^2$ (round off the first decimal place).

TABLE 1

|  | Surface A | Surface B |
|---|---|---|
| SRa [nm] | 28 | 20 |
| SRz [nm] | 428 | 403 |
| M-AREA [mm$^2$] | 0.249 | 0.249 |
| S-AREA [mm$^2$] | 0.1 | 0.1 |
| Z [nm] | COUNT | COUNT |
| 50 | 0.0000 | 0.0000 |
| 100 | 3.2295 | 0.0000 |

TABLE 1-continued

| | Surface A | Surface B |
|---|---|---|
| 150 | 22.5459 | 1.2861 |
| 200 | 76.7739 | 23.1676 |
| 250 | 116.7702 | 65.0220 |
| 300 | 69.6221 | 27.7269 |
| 350 | 32.2696 | 12.8513 |
| 400 | 19.2760 | 1.2048 |
| 450 | 11.9517 | 0.0000 |
| 500 | 3.0253 | 0.0000 |
| 550 | 0.0000 | 0.0000 |
| Total | 355.4642 | 131.2587 |

(10) Film Resistance of Metal Film

A rectangular specimen with a size of 10 mm in the length direction and the entire (50 mm) width in the width direction was cut out of metalized film. The resistance between two points of the metal film spaced 30 mm apart in the width direction was measured by the four terminal method and the measurement made was multiplied by the measuring width (10 mm) and divided by the distance between the electrodes (30 mm) to calculate the film resistance for a size of 10 mm×10 mm. (unit: Ω/□).

(11) Dielectric Breakdown Voltage of Film (V/μm)

According to method B (flat plate electrode method) specified in 7.4.11.2 of JIS C-2330 (2001), the average was determined and divided by the film thickness (μm) of the sample measured with a micrometer (described previously) and the calculation was expressed in V/μm.

(12) Element Processability (Yield of Wound Element) in Capacitor Production

On one surface of the polypropylene film obtained in each Example and Comparative example described later, aluminum was vacuum-deposited by a vacuum deposition apparatus manufactured by ULVAC to form an aluminum layer to achieve a film resistance of 8Ω/□. In doing this, aluminum was deposited on a stripe-like area with a marginal space extending in the length direction (repeatedly aluminum-deposited areas having a width of 39.0 mm, marginal spaces having a width of 1.0 mm). A knife is put into the center of each marginal space and the center of each metal deposited area to slit the film and wound up to provide a roll of a tape with a total width of 20 mm having a 0.5 mm marginal space along one, either right- or left-hand, edge. The tape from the wound roll with a margin on the left-hand edge and the tape from the wound roll with a margin on the right-hand edge are put one on top of the other such that the metal deposited area sticks out of the marginal space by 0.5 mm in the width direction, followed by winding up to provide a wound-up body having an electrostatic capacity of about 10 μF. The winding-up of the element was carried out by using KAW-4NHB manufactured by Kaido Mfg. Co., Ltd.

In the above capacitor production process, the entire winding step was observed visually and products suffering from creasing or slippage were rejected. The percent proportion of the rejected ones to the total number of products produced was used as indicator of processability (hereinafter referred to the yield of wound elements). A higher yield of wound elements is more preferable. A product was ranked as A (good), B, or C (defective) when the yield was 95% or more, less than 95% and 80% or more, or less than 80%, respectively. Ranks A and B represent practical levels.

50 products were produced for the evaluation.

(13) Evaluation of Characteristics of Metal-Deposited Capacitor

On the film obtained in each Example and Comparative example described later, aluminum was vacuum-deposited to achieve a film resistance of 8Ω/□, by a vacuum deposition apparatus manufactured by ULVAC, in a so-called T-type margin pattern having a margin in the direction perpendicular to the length direction to provide a metal-deposited roll with a width of 50 mm.

Then, using this roll, a capacitor element was wound up by an element winding-up machine (KAW-4NHB) manufactured by Kaido Mfg. Co., Ltd., which was subjected to thermal metal spraying and heat treatment under reduced pressure at a temperature of 105° C. for 10 hours, followed by attaching lead wires to produce a capacitor element. In this instance, the capacitor element had an electrostatic capacity of 5 μF.

Ten capacitor elements thus obtained were prepared and a voltage of 300 VDC was applied to the capacitor elements at a high temperature of 105° C. After maintaining the voltage for 10 minutes, the applied voltage was gradually increased in stages at a rate of 50 VDC/min. A step-like heating was repeated to conduct so-called step-up test. Changes in electrostatic capacity during this test were measured and plotted on a graph and the voltage at which the electrostatic capacity reached 70% of the initial value was divided by the thickness measured with a micrometer (described previously) to determine the withstand voltage of the capacitor. A capacitor having a withstand voltage of 450 V/μm or more was judged as having practical quality. Then, the withstand voltage of the capacitor was divided by the dielectric breakdown voltage of the film to determine the retention. Furthermore, the voltage was increased until the electrostatic capacity decreased to below 10% of the initial value and the capacitor element was disassembled to examine the state of destruction, followed by evaluating the security protection properties as described below:

A: Free from changes in element shape and free from observable penetrating destruction.

B: Free from changes in element shape, but suffering from observable penetrating destruction through not more than 10 film layers.

C: Suffering from observable changes in element shape or observable penetrating destruction through more than 10 film layers.

D: Suffering from destruction of element shape.

Products ranked as A can be used without problems and those ranked as B can be used under favorable conditions. Those ranked as C or D will not serve for practical uses.

EXAMPLES

Advantageous effects are described in more detail below with reference to Examples.

Example 1

A polypropylene resin product manufactured by Prime Polymer Co., Ltd. that had a mesopentad fraction of 0.985 and a melt mass flow rate (MFR) of 2.6 g/10 min was used as the straight polypropylene component and polypropylene resin that had a mesopentad fraction of 0.985 and a melt mass flow rate (MFR) of 4.0/10 min blended with 1.0 mass % of a branched polypropylene resin product manufactured by Basell (high melt tension polypropylene, Profax PF-814, 3 internal trisubstituted olefins contained for every 10,000 carbon atoms) was used as branched polypropylene (H). They were supplied to an extruder at a temperature of 250° C. and melt-extruded at a resin temperature of 250° C. from a T-type slit die to provide a sheet. The molten sheet was cooled and solidified on a cooling drum having a diameter of 1 m and maintained at 90° C. under the conditions of an air knife temperature of 30° C. and an air speed of 140 m/s. Measurements with a radiation thermometer showed that the retention time of the unstretched sheet at 110° C. to 135° C. was 2.5 seconds. Subsequently, the unstretched sheet was preheated gradually to 140° C. and, while being maintained at a temperature of 145° C., passed between rolls with different circumferential speeds for stretching of 4.8 times in the length direction. In this step, a radiation heater with an output of 3.5 kW was used for additional heating during the stretching. Following this, the film was introduced into a tenter where it was stretched 10 times in the width direction at a temperature of 158° C. and then heat-treated at 155° C. while being relaxed by 6% in the width direction, followed by cooling to provide biaxially orientated polypropylene film with a film thickness (t1) of 2.0 μm. Furthermore, the drum-side surface (surface A) of the biaxially orientated polypropylene film was subjected to corona discharge treatment in air at a processing intensity of 25 W·min/m². The biaxially orientated polypropylene film thus produced had characteristics as listed in Tables 2 and 3. The withstand voltage (dielectric breakdown voltage) of the resulting film, element processability (yield of wound elements), and capacitor characteristics are given in Table 4. It was found that the film was high in both withstand voltage and element processability.

Example 2

Except for setting the air knife temperature to 20° C., the same film production procedure as in Example 1 was carried out to produce biaxially orientated polypropylene film. Characteristics of the biaxially orientated polypropylene film thus produced are shown in Tables 2, 3, and 4.

Example 3

Except for setting the air knife temperature to 10° C., the same film production procedure as in Example 1 was carried out to produce biaxially orientated polypropylene film. Characteristics of the biaxially orientated polypropylene film thus produced are shown in Tables 2, 3, and 4.

Example 4

Except for setting the air knife temperature and the cooling drum temperature to 10° C. and 80° C., respectively, the same film production procedure as in Example 1 was carried out to produce biaxially orientated polypropylene film. Characteristics of the biaxially orientated polypropylene film thus produced are shown in Tables 2, 3, and 4.

Examples 5 and 6

Except for designing biaxially orientated polypropylene film having a thickness (t1) of 1.5 μm or 3.0 μm and setting the air knife temperature and the cooling drum temperature to 10° C. and 80° C., respectively, the same film production procedure as in Example 1 was carried out to produce biaxially orientated polypropylene film. Characteristics of the biaxially orientated polypropylene film thus produced are shown in Tables 2, 3, and 4.

Example 7

Except for designing biaxially orientated polypropylene film having a thickness (t1) of 1.5 μm and setting the air knife temperature and the cooling drum temperature to 10° C. and 85° C., respectively, the same film production procedure as in Example 1 was carried out to produce biaxially orientated polypropylene film. Characteristics of the biaxially orientated polypropylene film thus produced are shown in Tables 2, 3, and 4.

Example 8

Except for designing biaxially orientated polypropylene film having a thickness (t1) of 3.0 μm and setting the air knife temperature and the cooling drum temperature to 10° C. and 75° C., respectively, the same film production procedure as in Example 1 was carried out to produce biaxially orientated polypropylene film. Characteristics of the biaxially orientated polypropylene film thus produced are shown in Tables 2, 3, and 4.

Example 9

Except for designing biaxially orientated polypropylene film having a thickness (t1) of 3.0 μm and setting the air knife temperature to 0° C., the same film production procedure as in Example 1 was carried out to produce biaxially orientated polypropylene film. Characteristics of the biaxially orientated polypropylene film thus produced are shown in Tables 2, 3, and 4.

Example 10

Except for adding branched polypropylene resin (H) in an amount of 10 mass %, the same film production procedure as in Example 1 was carried out to produce biaxially orientated polypropylene film. Characteristics of the biaxially orientated polypropylene film thus produced are shown in Tables 2, 3, and 4.

Example 11

Except for adding branched polypropylene resin (H) in an amount of 5.0 mass % setting the air knife temperature and the cooling drum temperature to 10° C. and 80° C., respectively, the same film production procedure as in Example 1 was carried out to produce biaxially orientated polypropylene film. Characteristics of the biaxially orientated polypropylene film thus produced are shown in Tables 2, 3, and 4.

Example 12

Except for adding branched polypropylene resin (H) in an amount of 0.05 mass % setting the air knife temperature to 10° C., the same film production procedure as in Example 1 was carried out to produce biaxially orientated polypropylene film. Characteristics of the biaxially orientated polypropylene film thus produced are shown in Tables 2, 3, and 4.

Example 13

Except for setting the cooling drum temperature and the air knife temperature to 80° C. and 10° C., respectively, and omitting the addition of branched polypropylene resin (H), the same film production procedure as in Example 1 was carried out to produce biaxially orientated polypropylene film. Characteristics of the biaxially orientated polypropylene film thus produced are shown in Tables 2, 3, and 4.

Comparative Example 1

Except for using the air knife at ambient temperature (about 45° C.) without temperature control and omitting the addition of branched polypropylene resin (H), the same film production procedure as in Example 1 was carried out to produce biaxially orientated polypropylene film. Characteristics of the biaxially orientated polypropylene film thus produced are shown in Tables 2, 3, and 4.

Comparative Example 2

Except for using the air knife at ambient temperature (about 45° C.) without temperature control, omitting the addition of branched polypropylene resin (H), and setting the cooling drum temperature to 80° C., the same film production procedure as in Example 1 was carried out to produce biaxially orientated polypropylene film. Characteristics of the biaxially orientated polypropylene film thus produced are shown in Tables 2, 3, and 4.

Comparative Example 3

Except for using the air knife at ambient temperature (about 45° C.) without temperature control, omitting the addition of branched polypropylene resin (H), and setting the cooling drum temperature to 70° C., the same film production procedure as in Example 1 was carried out to produce biaxially orientated polypropylene film. Characteristics of the biaxially orientated polypropylene film thus produced are shown in Tables 2, 3, and 4.

Comparative Example 4

Except for using the air knife at ambient temperature (about 45° C.) without temperature control, the same film production procedure as in Example 1 was carried out to produce biaxially orientated polypropylene film. Characteristics of the biaxially orientated polypropylene film thus produced are shown in Tables 2, 3, and 4.

Comparative Example 5

Except for using the air knife at ambient temperature (about 45° C.) without temperature control and setting the cooling drum temperature to 80° C., the same film production procedure as in Example 1 was carried out to produce biaxially orientated polypropylene film. Characteristics of the biaxially orientated polypropylene film thus produced are shown in Tables 2, 3, and 4.

Comparative Example 6

Except for designing biaxially orientated polypropylene film having a thickness (t1) of 5.0 μm and using the air knife at ambient temperature (about 45° C.) without temperature control, the same film production procedure as in Example 1 was carried out to produce biaxially orientated polypropylene film. Characteristics of the biaxially orientated polypropylene film thus produced are shown in Tables 2, 3, and 4.

Comparative Examples 7 and 8

Except for designing biaxially orientated polypropylene film having a thickness (t1) of 5.0 μm or 3.0 μm, using the air knife at ambient temperature (about 45° C.) without temperature control, and setting the cooling drum temperature to 80° C., the same film production procedure as in Example 1 was carried out to produce biaxially orientated polypropylene film. Characteristics of the biaxially orientated polypropylene film thus produced are shown in Tables 2, 3, and 4.

Comparative Example 9

Except for designing biaxially orientated polypropylene film having a thickness (t1) of 1.5 μm, using the air knife at ambient temperature (about 45° C.) without temperature control, and setting the cooling drum temperature to 85° C., the same film production procedure as in Example 1 was carried out to produce biaxially orientated polypropylene film. Characteristics of the biaxially orientated polypropylene film thus produced are shown in Tables 2, 3, and 4.

Comparative Examples 10 and 11

Except for designing biaxially orientated polypropylene film having a thickness (t1) of 1.5 μm or 3.0 μm, using the air knife at ambient temperature (about 45° C.) without temperature control, and setting the cooling drum temperature to 75° C., the same film production procedure as in Example 1 was carried out to produce biaxially orientated polypropylene film. Characteristics of the biaxially orientated polypropylene film thus produced are shown in Tables 2, 3, and 4.

Comparative Example 12

Except for designing biaxially orientated polypropylene film having a thickness (t1) of 5.0 μm, using the air knife at ambient temperature (about 45° C.) without temperature control, and setting the cooling drum temperature to 60° C., the same film production procedure as in Example 1 was carried out to produce biaxially orientated polypropylene film. Characteristics of the biaxially orientated polypropylene film thus produced are shown in Tables 2, 3, and 4.

Comparative Example 13

Except for adding branched polypropylene resin (H) in an amount of 15 mass %, the same film production procedure as in Example 1 was carried out to produce biaxially orientated polypropylene film. Characteristics of the biaxially orientated polypropylene film thus produced are shown in Tables 2, 3, and 4.

TABLE 2

|  | Content of branched polypropylene (mass %) | Air knife temperature (° C.) | Cooling drum temperature (° C.) | Thickness t1 (μm) | SRz (nm) Surface A | SRz (nm) Surface B | SRa (nm) Surface A | SRa (nm) Surface B |
|---|---|---|---|---|---|---|---|---|
| Example 1 | 1.0 | 30 | 90 | 2.0 | 428 | 403 | 28 | 20 |
| Example 2 | 1.0 | 20 | 90 | 2.0 | 376 | 285 | 25 | 18 |

TABLE 2-continued

| | Content of branched polypropylene (mass %) | Air knife temperature (° C.) | Cooling drum temperature (° C.) | Thickness t1 (μm) | SRz (nm) Surface A | SRz (nm) Surface B | SRa (nm) Surface A | SRa (nm) Surface B |
|---|---|---|---|---|---|---|---|---|
| Example 3 | 1.0 | 10 | 90 | 2.0 | 326 | 152 | 23 | 15 |
| Example 4 | 1.0 | 10 | 80 | 2.0 | 118 | 104 | 15 | 12 |
| Example 5 | 1.0 | 10 | 80 | 1.5 | 58 | 56 | 12 | 11 |
| Example 6 | 1.0 | 10 | 80 | 3.0 | 350 | 223 | 23 | 18 |
| Example 7 | 1.0 | 10 | 85 | 1.5 | 157 | 87 | 18 | 11 |
| Example 8 | 1.0 | 10 | 75 | 3.0 | 254 | 187 | 21 | 18 |
| Example 9 | 1.0 | 0 | 90 | 3.0 | 388 | 57 | 28 | 7 |
| Example 10 | 10.0 | 30 | 90 | 2.0 | 380 | 375 | 14 | 15 |
| Example 11 | 5.0 | 10 | 80 | 2.0 | 248 | 224 | 22 | 20 |
| Example 12 | 0.05 | 10 | 90 | 2.0 | 392 | 214 | 25 | 17 |
| Example 13 | 0.0 | 10 | 80 | 2.0 | 487 | 452 | 22 | 16 |
| Comparative Example 1 | 0.0 | 45 | 90 | 2.0 | 1438 | 1102 | 45 | 38 |
| Comparative Example 2 | 0.0 | 45 | 80 | 2.0 | 782 | 897 | 36 | 38 |
| Comparative Example 3 | 0.0 | 45 | 70 | 2.0 | 354 | 384 | 13 | 12 |
| Comparative Example 4 | 1.0 | 45 | 90 | 2.0 | 703 | 789 | 40 | 36 |
| Comparative Example 5 | 1.0 | 45 | 80 | 2.0 | 489 | 543 | 28 | 34 |
| Comparative Example 6 | 1.0 | 45 | 90 | 5.0 | 1232 | 896 | 53 | 41 |
| Comparative Example 7 | 1.0 | 45 | 80 | 5.0 | 998 | 845 | 44 | 42 |
| Comparative Example 8 | 1.0 | 45 | 80 | 3.0 | 408 | 398 | 32 | 31 |
| Comparative Example 9 | 1.0 | 45 | 85 | 1.5 | 233 | 228 | 25 | 25 |
| Comparative Example 10 | 1.0 | 45 | 75 | 1.5 | 138 | 178 | 18 | 23 |
| Comparative Example 11 | 1.0 | 45 | 75 | 3.0 | 328 | 362 | 28 | 30 |
| Comparative Example 12 | 1.0 | 45 | 60 | 5.0 | 258 | 226 | 15 | 13 |
| Comparative Example 13 | 15.0 | 30 | 90 | 2.0 | 287 | 262 | 20 | 18 |

TABLE 3

| | Pa (number per 0.1 mm$^2$) | Pb (number per 0.1 mm$^2$) | Pa50-250/Pa | Pb50-250/Pb | SRz/SRa Surface A | SRz/SRa Surface B |
|---|---|---|---|---|---|---|
| Example 1 | 355 | 131 | 0.62 | 0.68 | 15 | 20 |
| Example 2 | 340 | 115 | 0.68 | 0.78 | 15 | 16 |
| Example 3 | 328 | 85 | 0.66 | 0.82 | 14 | 10 |
| Example 4 | 206 | 72 | 0.8 | 0.87 | 8 | 9 |
| Example 5 | 172 | 62 | 0.95 | 0.98 | 5 | 5 |
| Example 6 | 303 | 138 | 0.72 | 0.76 | 15 | 12 |
| Example 7 | 227 | 79 | 0.83 | 0.86 | 9 | 8 |
| Example 8 | 228 | 126 | 0.67 | 0.79 | 12 | 10 |
| Example 9 | 380 | 52 | 0.53 | 0.99 | 14 | 8 |
| Example 10 | 372 | 148 | 0.35 | 0.4 | 28 | 25 |
| Example 11 | 330 | 143 | 0.92 | 0.89 | 11 | 11 |
| Example 12 | 213 | 57 | 0.61 | 0.72 | 16 | 13 |
| Example 13 | 163 | 55 | 0.53 | 0.51 | 22 | 16 |
| Comparative Example 1 | 298 | 250 | 0.15 | 0.25 | 32 | 29 |
| Comparative Example 2 | 221 | 198 | 0.32 | 0.24 | 22 | 24 |
| Comparative Example 3 | 98 | 88 | 0.65 | 0.68 | 27 | 32 |
| Comparative Example 4 | 398 | 254 | 0.35 | 0.31 | 18 | 22 |

TABLE 3-continued

|  | Pa (number per 0.1 mm²) | Pb (number per 0.1 mm²) | Pa50-250/Pa | Pb50-250/Pb | SRz/SRa Surface A | SRz/SRa Surface B |
|---|---|---|---|---|---|---|
| Comparative Example 5 | 264 | 236 | 0.61 | 0.22 | 17 | 16 |
| Comparative Example 6 | 489 | 362 | 0.18 | 0.23 | 23 | 22 |
| Comparative Example 7 | 357 | 309 | 0.23 | 0.28 | 23 | 20 |
| Comparative Example 8 | 378 | 387 | 0.65 | 0.65 | 13 | 13 |
| Comparative Example 9 | 275 | 276 | 0.82 | 0.78 | 9 | 9 |
| Comparative Example 10 | 92 | 78 | 0.78 | 0.77 | 8 | 8 |
| Comparative Example 11 | 256 | 332 | 0.68 | 0.66 | 12 | 12 |
| Comparative Example 12 | 162 | 148 | 0.96 | 0.98 | 15 | 13 |
| Comparative Example 13 | 492 | 208 | 0.30 | 0.32 | 20 | 18 |

TABLE 4

|  | Dielectric breakdown voltage (V/μm) | Capacitor characteristics | | | |
|---|---|---|---|---|---|
|  |  | Yield of wound elements | Withstand voltage (V/μm) | Retention (%) | Security Protection properties |
| Example 1 | 628 | A | 471 | 75 | A |
| Example 2 | 646 | A | 485 | 75 | A |
| Example 3 | 658 | B | 507 | 77 | A |
| Example 4 | 687 | B | 536 | 78 | B |
| Example 5 | 695 | B | 528 | 76 | B |
| Example 6 | 651 | B | 501 | 77 | A |
| Example 7 | 665 | B | 519 | 78 | B |
| Example 8 | 672 | B | 511 | 76 | A |
| Example 9 | 657 | A | 460 | 70 | B |
| Example 10 | 596 | A | 459 | 77 | B |
| Example 11 | 643 | A | 453 | 70 | B |
| Example 12 | 618 | A | 476 | 77 | B |
| Example 13 | 632 | B | 455 | 72 | B |
| Comparative Example 1 | 545 | B | 340 | 62 | A |
| Comparative Example 2 | 602 | A | 355 | 59 | A |
| Comparative Example 3 | 685 | C | 527 | 77 | D |
| Comparative Example 4 | 617 | A | 365 | 59 | A |
| Comparative Example 5 | 613 | A | 429 | 70 | C |
| Comparative Example 6 | 560 | A | 381 | 68 | A |
| Comparative Example 7 | 589 | A | 360 | 61 | A |
| Comparative Example 8 | 602 | A | 409 | 68 | B |
| Comparative Example 9 | 590 | A | 431 | 73 | B |
| Comparative Example 10 | 662 | C | 477 | 72 | D |
| Comparative Example 11 | 618 | A | 420 | 68 | B |
| Comparative Example 12 | 608 | C | 444 | 73 | C |
| Comparative Example 13 | 593 | A | 433 | 73 | C |

The invention claimed is:

1. A biaxially orientated polypropylene film comprising protrusions on both surfaces thereof, the biaxially orientated polypropylene film having a thickness (t1) of 1 to 3 μm, having a ten point average roughness (SRz) of 50 nm or more and less than 500 nm on both surfaces, and meeting equations (1) and (2) where one surface and another surface are referred to as a surface A and a surface B, respectively:

$$150 \leq Pa \leq 400 \quad (1)$$

$$50 \leq Pb \leq 150 \quad (2)$$

wherein Pa denotes number of protrusions per 0.1 mm² on the surface A and Pb denotes number of protrusions per 0.1 mm² on the surface B, wherein the biaxially orientated polypropylene film meets both of equations (3) and (4):

$$0.5 \leq Pa50\text{-}250/Pa \leq 1.0 \quad (3)$$

$$0.5 \leq Pb50\text{-}250/Pb \leq 1.0 \quad (4)$$

wherein Pa50-250 denotes number of protrusions with a height of 50 nm or more and less than 250 nm per 0.1 mm² on the surface A and Pb50-250 denotes number of protrusions with a height of 50 nm or more and less than 250 nm per 0.1 mm² on the surface B.

2. The biaxially orientated polypropylene film according to claim 1, wherein center line average roughness (SRa) is 10 nm or more and 30 nm or less on both the surfaces.

3. The biaxially orientated polypropylene film according to claim 1, wherein the ten point average roughness (SRz) is 50 nm or more and less than 400 nm on both the surfaces.

4. The biaxially orientated polypropylene film according to claim 1, wherein the biaxially orientated polypropylene film contains 0.05 mass % to 10 mass % of a branched polypropylene (H).

5. A metalized film comprising:
a biaxially orientated polypropylene film, comprising protrusions on both surfaces thereof, the biaxially orientated polypropylene film having a thickness (t1) of 1 to 3 μm, having a ten point average roughness (SRz) of 50 nm or more and less than 500 nm on both surfaces, and meeting equations (1) and (2) where one surface and the other surface are referred to as a surface A and a surface B, respectively:

$$150 \leq Pa \leq 400 \quad (1)$$

$$50 \leq Pb \leq 150 \quad (2)$$

wherein Pa denotes number of protrusions per 0.1 mm² on the surface A and Pb denotes number of protrusions per 0.1 mm² on the surface B; and a metal film provided on at least one surface thereof, wherein the biaxially orientated polypropylene film meets both of equations (3) and (4):

$$0.5 \leq Pa50\text{-}250/Pa \leq 1.0 \quad (3)$$

$$0.5 \leq Pb50\text{-}250/Pb \leq 1.0 \quad (4)$$

wherein Pa50-250 denotes number of protrusions with a height of 50 nm or more and less than 250 nm per 0.1 mm² on the surface A and Pb50-250 denotes number of protrusions with a height of 50 nm or more and less than 250 nm per 0.1 mm² on the surface B.

6. The metalized film according to claim 5, wherein the metal film has a surface electric resistivity of 1 to 20 Ω/□.

7. A film capacitor comprising:
   a metalized film comprising:
      a biaxially orientated polypropylene film comprising protrusions on both surfaces thereof, the biaxially orientated polypropylene film having a thickness (t1) of 1 to 3 μm, having a ten point average roughness (SRz) of 50 nm or more and less than 500 nm on both surfaces, and meeting equations (1) and (2) where one surface and the other surface are referred to as a surface A and a surface B, respectively:

$$150 \leq Pa \leq 400 \quad (1)$$

$$50 \leq Pb \leq 150 \quad (2)$$

wherein Pa denotes number of protrusions per 0.1 mm² on the surface A and Pb denotes number of protrusions per 0.1 mm² on the surface B; and a metal film provided on at least one surface thereof, wherein the biaxially orientated polypropylene film meets both of equations (3) and (4):

$$0.5 \leq Pa50\text{-}250/Pa \leq 1.0 \quad (3)$$

$$0.5 \leq Pb50\text{-}250/Pb \leq 1.0 \quad (4)$$

wherein Pa50-250 denotes number of protrusions with a height of 50 nm or more and less than 250 nm per 0.1 mm² on the surface A and Pb50-250 denotes number of protrusions with a height of 50 nm or more and less than 250 nm per 0.1 mm² on the surface B.

* * * * *